July 29, 1941.   A. G. M. MICHELL ET AL   2,250,546
BEARING
Filed Sept. 8, 1937   2 Sheets-Sheet 2
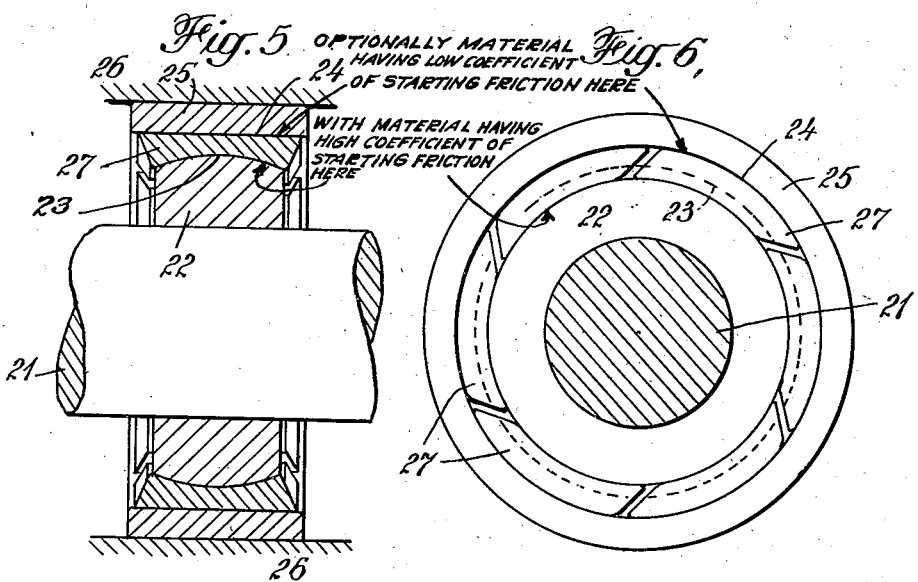
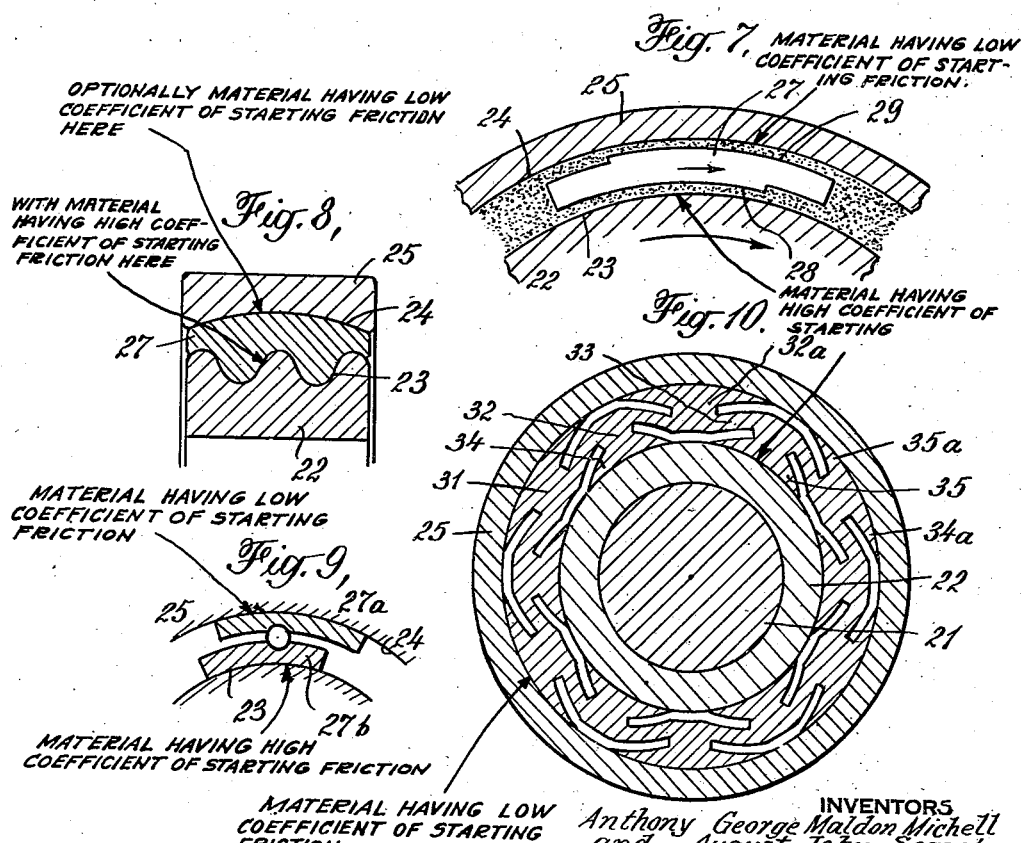
INVENTORS
Anthony George Maldon Michell
and August John Seggel
BY
Marshall & Hawley
ATTORNEYS Patented July 29, 1941

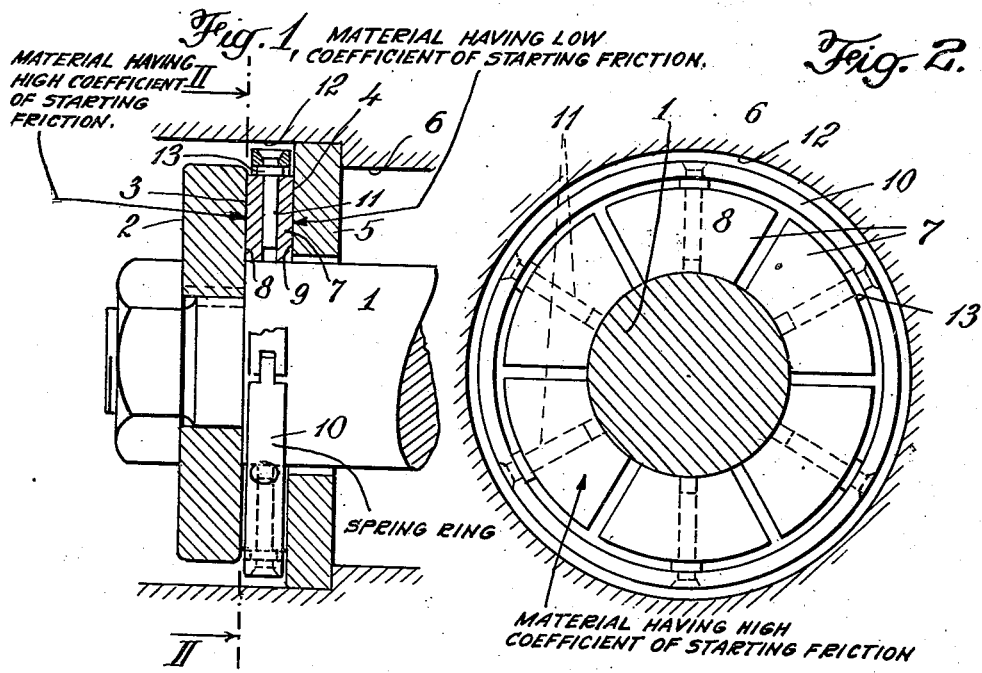
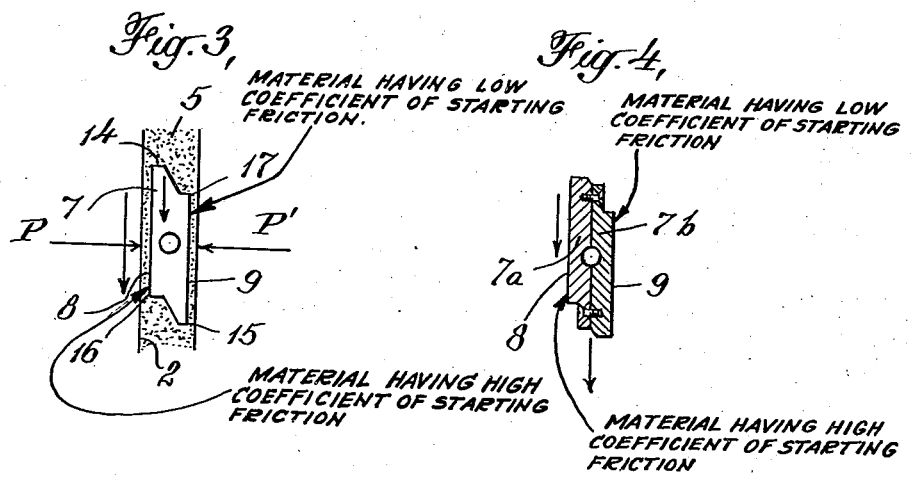

2,250,546

UNITED STATES PATENT OFFICE 2,250,546

BEARING

Anthony George Maldon Michell and August John Seggel, Melbourne, New South Wales, Australia Application September 8, 1937, Serial No. 162,834
In Australia September 10, 1936

10 Claims. (Cl. 308—73)

This invention relates to bearings in which films of lubricant are formed between the bearing members by the tilting or deflecting of segmental elements hereinafter called pads. In the most usual form of these bearings the pads are mechanically pivoted upon one or other of the relatively moving bearing members and if such pads are intended to rotate they do so at the same speed as the bearing member to which they are attached. In the form to which the present invention relates the pads are interposed in an annular series between relatively rotating members of the bearing, (e. g. between a shaft-collar and a race of a thrust bearing, or between the journal, or a journal-collar, and an outer bearing member or race of a journal bearing), the series of pads being intended to revolve about the axis of the bearing at a different speed from each of these members.

In both forms solid contact necessarily exists between the pads and the other members at the moment of starting the bearing under load. Relative motion between the mutually contacting surfaces must of course take place before the films of lubricant, with which the bearing is intended to operate when in action, can be formed.

Thrust bearings with pads arranged in the second of the modes above-mentioned, (as well as the first), were described in British patent specification No. 875 of 1905 and in Australian patent specification No. 4114/05, and constructions of the second kind have also been proposed for journal-bearings, a series of pads being interposed between an inner revolving journal, or journal collar, and a stationary outer race of the bearing, both the inner and outer surfaces of the pads, and the surfaces with which they make working contact, being of cylindrical form.

Such bearings, as hitherto constructed or proposed, have however been subject to the defect that the intended series of pads was in practice inoperative, or their operation was at best fortuitous and unreliable. We have traced the cause of the defect as arising from the failure of the series of pads to start moving relatively to the stationary member, due to the moment of the frictional resistances opposed to their motion being in such bearings as great as, and as a rule greater than, the moment of the forces tending to start their revolution. Even if the revolution should be in particular instances started, owing to the pads being free from load or to other special circumstances, it is in such bearings liable to cease if direct contact should take place between the pads and the opposed working surfaces owing to the presence of solid particles or other disturbance of the action of the lubricating films. On account of this defect no bearings of the class in question have, so far as we are aware, come into practical use.

The present invention consists essentially in the means provided for overcoming such defective features of the class of bearings in question and so rendering them practically useful.

In the accompanying drawings,

Fig. 1 is an axial section of a thrust bearing embodying the invention, and

Fig. 2 is a transverse section of the same bearing on line II, II of Fig. 1.

Fig. 3 and Fig. 4 show alternative forms of the pads of the bearing shown in Figs. 1 and 2.

Figs. 5 to 10 illustrate the application of the invention to journal bearings,

Fig. 5 being an axial section, and

Fig. 6 a side view of one form of the bearing, while

Fig. 7 is an enlarged, and partly diagrammatic, view of one of the pads.

Fig. 8 is an axial section of a portion of a journal bearing showing an alternative construction, and Fig. 9 shows an alternative form of pad, applicable to the constructions shown in Figs. 5, 6 and 8.

Fig. 10 shows, in transverse section, an alternative form of the application of the invention to journal bearings.

As shown in Figs. 1 and 2, the shaft 1 to which the thrust-bearing is applied has rigidly mounted upon it the thrust-collar 2, of which the plane working surface 3 is opposed to the corresponding plane surface 4 of the stationary member, or race, 5, supported by the frame 6 of the machine.

The thrust-bearing pads 7, which are of segmental form as shown in Fig. 2, are arranged in a circumferential series between the collar 2, and race 5, and are provided with bearing faces 8 and 9 adapted to make lubricated working contact with the surfaces 3 and 4 respectively. Each pad 7, may be formed in a single piece as shown in transverse section in Fig. 3, or may be composed of two pieces 7a, 7b, as in Fig. 4, which may either be rigidly attached together, or pivoted upon one another as described in the patents hereinbefore cited. The several pads are preferably mounted in a cage, which may consist of an outer circumferential ring 10 and radial pins 11 rigidly secured therein, the cage together with the pads thus forming a unit adapted to revolve as a whole about the axis of the shaft, independently of the collar 2. A circumferential surface 12 may be formed on the frame 6 to prevent undue radial displacement of the cage.

The bearing surfaces 8 and 9 of each pad are preferably offset with respect to one another as shown in Figs. 3 and 4, the directions of motion of the collar 2 with respect to the pads and of the pads with respect to the race 5 being as indicated by the arrows in these figures.

In order that the revolution of the series of pads may start simultaneously with the revolution of the shaft, even under a loaded condition of the bearing, the pair of materials forming the mutually contacting surfaces 4 and 9 of the pads with the stationary race 5 are so chosen that the coefficient of starting friction at their contact is lower than that of the pair of materials forming the mutually contacting surfaces 3 and 8 of the shaft collar 2 with the pads. (It is to be noted that in this paragraph and throughout the present specification we refer to a member as being "stationary" when it has no, or, as in the case of an engine connecting rod, only a small and secondary rotation with respect to the frame of the machine, around the axis of the bearing.)

Since the loads carried by the two pairs of contacting surfaces just mentioned are equal, or very nearly so, the frictional moment applied by the collar 2 to the series of pads will, with such dissimilar materials, be greater at starting than the resisting moment applied to them by the race 5 and the pads will commence to revolve.

It is to be understood that the "coefficient of starting friction," (for which we hereinafter use, for brevity, the word "coefficient"), is to be measured or estimated under conditions corresponding to those existing at starting in bearings of the film-lubricated class, that is to say, with intensities of loads similar to those which normally occur in these bearings, and with lubricant present around the bearing surfaces.

We have found that comparatively wide differences, amply sufficient for carrying out the purpose herein explained, exist between various bearing metals which are in ordinary use. Thus, if the surfaces 8 of the pads are faced in the well known way with a "babbitt," or "white metal" of usual composition, such as tin 90 parts, antimony 7 parts, copper 3 parts by weight, the surfaces 9 of the pads may be faced with the "white-metal" alloy having approximately the composition cadmium 90, antimony 5, and copper 5 parts, the collar 2 and the race 5 being both of steel. We have found that the coefficients of these respective pairs of metals are in the proportion of approximately 3 to 2.

Alternatively the surfaces 8 and 9 of the pads may be both formed of one or other of the "white metals" above-mentioned, the collar 2 being of phosphor-bronze and the race 5 of steel, as we have found that the coefficient of phosphor bronze with each of these bearing metals, is more than double the coefficient of steel with the same metal.

Other suitable pairs of metals will be referred to hereinafter in connection with the application to journal bearings.

As further provision for the same purpose of causing the revolution of the pads to start with that of the collar, the ring 10 of the cage may be formed as a spring-ring, which, when stationary, presses the pads 7, (either directly, or through collars 13 formed on the pins 11), radially inwards into contact with the shaft 1 as indicated in Figs. 1 and 2. The frictional resistance at this contact then assists that between the faces 3 and 8 in causing the pads to commence revolving with the collar.

In place of a resilient ring 10, as above described, a rigid ring may be employed with springs of helical or other form interposed between the pads and its inner periphery, the pads being then made of such a shape that some portion of them makes contact with the surface 12 of the casing 6, when the springs are subjected to the centrifugal forces, corresponding to high speeds while the inner edges of the pads make contact with the shaft at low speeds, and in the stationary condition, as already described.

In the mode of application of the invention to a journal bearing shown in Figs. 5 to 9, the journal bearing surface is formed on a collar 22, formed or mounted upon, and rotating with, the shaft 21, and having a bearing surface 23 which may be either spherical as shown, or cylindrical, or of some other form of revolution coaxial with the shaft. The stationary bearing surface 24 is formed on the inner periphery of the race 25, and may also be either cylindrical as shown, or spherical, or of the form of any other suitable surface of revolution, this race being mounted in a housing machined in the fixed frame 26 of the machine.

The bearing pads 27 are arranged in a circumferential series between the collar 22 and the race 25, each of the pads, (see Fig. 7), having an internal surface 28 contacting with the journal surface 23, and an external bearing surface 29 contacting with the surface 24 of the race 25, sufficient clearance being allowed to permit the pads to move circumferentially with films of lubricant interposed between the surfaces. The outlines of the individual pads, as seen in projection on a tangential plane, may be either rectangular or of other suitable form. They may, for instance, be of longitudinally tapering or scutiform shape as described in United States Patent No. 1,507,020 or, in order to retain each pad in correct location with respect to the adjacent pads of the series, it may be formed with projections or recesses by which mutual engagement of the pads is effected. Alternatively, the pads of the series may be retained in correct position by being severally connected to a retaining ring or cage corresponding to those commonly used in ball or roller bearings, or to that hereinbefore described in connection with a thrust-bearing. When such rings or cages are used the pads may be flexibly attached to them by pins or the like, and the outlines of the bearing portions of the pads may then conveniently be circular with a view to simplifying manufacture.

As in the hereinbefore-described thrust-bearing, the pads 27 may each be either in one piece (Figs. 5 to 7), or in two pieces, 27a, 27b, Fig. 9, and in the latter case may either be rigidly connected together or pivoted upon one another at or near the middle of the length of the combined pad as shown. The effective surfaces, 28, 29 of each pad preferably extend over only a portion of its circumferential length.

As in the case of the thrust-bearing also, the surfaces of the pads in contact with the stationary race are faced with, or composed of, a material having a lower coefficient of static friction with the race than the coefficient of friction between the pad and the rotating collar, in order that the intended revolution of the series of pads may be initiated from a state of rest.

Thus, both the collar 22 and the race 25, being of steel, the pads may be made of cast-iron, preferably of a hard and dense quality, polished on their outer faces 29 while the inner faces may be lined with the tin-base white-metal, as hereinbefore specified in connection with thrust-bearings, these pair of metals having a much higher coefficient than the pair steel and cast-iron.

The spherical form of the collar 22 and the internal surfaces of the pads 27 as shown in Figs. 5 and 6, the outer surfaces of the pads being cylindrical, is favorable to the starting action hereinbefore described since, due to the inclination of the outer zones of the spherical surface, the sum of the contact pressures between the collar 22 and the pads 27, corresponding to a given load on the shaft, is greater than the sum of the pressures between the pads 27 and the outer member 25. The spherical surfaces of the collar 22, and the pads 27, also permit automatic alignment of the bearing with another bearing on the same shaft, in the manner well known.

As alternative means for producing the desired starting effect, the surface of the collar 22 may, as shown in Fig. 8, be formed as a surface of revolution of which the generating line is sinuous or is otherwise inclined in part more steeply towards the axis than the circular generating line of the sphere indicated in Fig. 5, the sum of the pressures on the internal surfaces of the pads being thus increased to any desired degree above the sum of the pressures on their external faces.

As further alternatives the outer surfaces of the pads 27 may be faced with a friction-reducing material, instead of their inner surfaces being faced with a friction-increasing material or both surfaces may be faced with materials having friction-coefficients in the required relation to one another.

For example, the pads may be of the tin-base white metal already mentioned, or of a well-known bearing alloy consisting of approximately 46 parts by weight of tin, 42 parts of lead and 12 parts of antimony, and the inner surfaces 28 may be formed directly on this metal, while the outer surfaces 29 are faced with the cadmium alloy already mentioned, and both the collar 22 and race 25 are of steel with polished faces 23 and 24. Alternatively the pads may be of steel or other metal faced on the inside with the said tin base, or the said tin-lead base alloy, and on the outside with the cadmium alloy.

We have found that the coefficients of the said tin base, and said tin-lead base alloys upon steel are approximately equal both being about 50 per cent. greater than the coefficient of the cadmium alloy on steel.

The same effects may of course be obtained by the use in the collar 22 and race 25 of different materials, or by applying different facing materials to form the faces 23 and 24 thereon, such materials having the required ratio of coefficients in contact with the pads, in this case composed of the same material throughout or faced on both the faces 28 and 29 with the same material. Thus, as hereinbefore stated for the corresponding parts of thrust-bearings, the collar 22 may be of phosphor bronze and the race 25 of steel, the pads being either wholly composed of, or lined on both inner and outer faces with, one of the white-metal alloys hereinbefore specified.

Alternatively again, the required effect may be obtained by suitable selection of different materials for the collar 22 and the race 25, these materials having the required difference of frictional coefficient in contact with the material of the pad 27. It is for instance known that the coefficient of static friction between polished steel and white bearing-metals or Babbitt metal is much greater than between two faces of polished steel. Thus if the collar 22, pads 27 and race 25 are all of steel and either the outer face of the collar, or the inner faces of the pad, are faced with one of Babbitt-metal, all the other bearing surfaces being merely polished, the initial relative motion will take place between the pads 27 and race 25, as desired.

In the alternative mode of construction of the series of pads for a journal bearing shown in Fig. 10, an integral ring, 31, is composed of pad-members 32, 32a, and connecting members 33, in such a manner that the leading edges 34, 34a of the pad members 32, 32a, being relatively thin, are capable of deflecting resiliently so as to permit the formation of wedge-shaped films of lubricant between them and the coacting surfaces of the collar 22 and the race 25. This action is supplemented by the resilience of the members 33, connecting the adjacent pads, the pads being thereby rendered capable of tilting as individual wholes.

In the particular form of this type which is shown in Fig. 10, the edges 35 and 35a, of the pad-members 32, 32a, are of similar reduced thickness as the edges 34, 34a, so that the bearing is capable of functioning similarly with either direction of rotation. In Fig. 10, also, the pad-members numbered 32 and those numbered 32a, form two distinct series, the former coacting with the collar 22, and the latter with the race 25. Similar integral constructions may be employed in which there is only one annular series of pads connected together by resilient members, each pad in this case having two faces one of which makes sliding contact with a collar, as 22, and the other with a race, as 25.

Alternatively again, one of the series of deflecting pad members 32 and 32a may be replaced by tilting pads. In all cases the materials and/or form of the respective contact surfaces are differentiated in the manner already described in order to effect the starting of the rotation of the annular series of pads.

To guard against failure of this starting action, due, for instance, to increase of the viscosity of the lubricant at exceptionally low temperatures or as the result of long inaction of the bearing, means such as those described in United States Patent No. 1,236,337 may be employed, in certain cases, for introducing a fresh film of lubricant under the loaded pads of the bearing at starting, and means may be provided for warming the oil so introduced, or, with the same object, means may be incorporated for warming a portion, or the whole, of the bearing itself.

What we claim is:

1. In the type of bearings which comprises a rotatable member, a stationary member and an interposed anti-friction device rotatable in relation to both of said members, in which said device has parts contacting the respective members, in which the total starting friction between said device and the stationary member is less than the total starting friction between the moving member and the device, whereby movement of the rotatable member upon starting will be imparted to the device to initiate the rotation of the device.

2. In a bearing wherein the load is transmitted from the moving member to the stationary member through interposed tilting pad elements rotatable with respect to said members, elastic means producing at starting frictional resistance to rotation of the moving member relatively to the pad elements additional to the resistance between said moving member and said pad elements due to the load on bearing.

3. A bearing comprising a moving member, a stationary member and interposed tilting pad elements rotatable with respect to both of said members and having surfaces contacting with both of the members, the contacting surfaces between the stationary member and the pad elements being of different materials than those between the moving member and said elements, so arranged that the friction of the stationary member resisting the rotation of the pad elements is less than the friction of the moving member tending to rotate said elements.

4. In a bearing, tilting pad elements interposed between moving and stationary members of the bearing so as to be circumferentially rotatable in relation to each of said members and to make lubricated sliding contact therewith, said pad elements being formed with a material in contact with said moving member having a higher coefficient of friction therewith than the coefficient of friction at the contacts of said pad elements with said stationary member.

5. In a journal bearing, a series of load-carrying tilting pad elements interposed between inner and outer relatively rotating members of the bearing so arranged as to be circumferentially rotatable in relation to each of said members and to make lubricated sliding contact therewith, said pad elements having segmental spherical inner surfaces and segmental cylindrical outer surfaces making contact respectively with a spherical outer surface formed upon the inner of said members and a cylindrical inner surface formed upon the outer of said members.

6. In a journal bearing, a series of load carrying tilting pad elements interposed between inner and outer relatively rotating members of the bearing so arranged as to be circumferentially rotatable in relation to each of them and to make lubricated sliding contact therewith, said pad elements being formed with segmental spherical surfaces making contact with a spherical inner surface formed upon the outer of said members and with inner surfaces forming segments of a surface of revolution which in parts is more steeply inclined to the axis of rotation than any part of said spherical surfaces.

7. In a journal bearing, a series of load carrying tilting pad elements interposed between a rotating inner member and a stationary outer member so arranged as to be circumferentially rotatable in relation to each of said members and to make lubricated sliding contact therewith, said pad elements having segmental spherical inner surfaces making contact with a spherical outer surface upon the inner of said members and segmental cylindrical outer surfaces making contact with an inner cylindrical surface upon the outer of said members, the pair of materials making mutual contact on the spherical surfaces having a higher coefficient of friction than the pair of materials making mutual contact on the cylindrical surfaces.

8. In a bearing, tilting pad elements interposed between and rotatable with respect to moving and stationary members of ferrous material, the surfaces of the said elements in contact with the stationary member being formed of an alloy consisting chiefly of cadmium and the surfaces of said elements in contact with the moving member being an alloy consisting chiefly of tin or of tin together with lead.

9. In a journal bearing, a series of load-carrying tilting pad elements interposed between a rotating inner member and a stationary outer member so arranged as to be circumferentially rotatable relatively to each of said members and to make lubricated sliding contact therewith, said pad elements having segmental spherical inner surfaces making contact with a spherical outer surface upon said inner member and segmental cylindrical outer surfaces making contact with a cylindrical inner surface upon said outer member, the said cylindrical and spherical surfaces of said pad elements being formed respectively of an alloy consisting chiefly of cadmium and an alloy consisting chiefly of tin or of tin together with lead, and the contacting surfaces of said inner and outer members consisting of ferrous material.

10. In a journal bearing, tilting pad elements interposed between moving and stationary members of the bearing so arranged as to be circumferentially rotatable in relation to each of said members and to make lubricated sliding contact therewith, the surfaces of the said moving member and the corresponding surfaces of the pad elements in contact therewith being in part at least more steeply inclined towards the axis than the surfaces of the said stationary member and the surfaces of the pad elements corresponding thereto.

ANTHONY GEORGE MALDON MICHELL.
AUGUST JOHN SEGGEL.